US010831530B2

(12) United States Patent
De Caro et al.

(10) Patent No.: US 10,831,530 B2
(45) Date of Patent: Nov. 10, 2020

(54) SECURE CONSENSUS-BASED ENDORSEMENT FOR SELF-MONITORING BLOCKCHAIN

(71) Applicant: International Business Machines Corporation, Armonk, NY (US)

(72) Inventors: Angelo De Caro, Zürich (CH); Senthilnathan Natarajan, Bangalore (IN); Chun Hui Suen, Singapore (SG); Emanuele Ragnoli, Mulhuddart (IE); Yohei Ueda, Tokyo (JP); Venkatraman Ramakrishna, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 16/007,247

(22) Filed: Jun. 13, 2018

(65) Prior Publication Data

US 2019/0384627 A1    Dec. 19, 2019

(51) Int. Cl.
*G06F 9/46*        (2006.01)
*G06F 9/50*        (2006.01)

(52) U.S. Cl.
CPC ............ *G06F 9/466* (2013.01); *G06F 9/5083* (2013.01); *G06F 2209/501* (2013.01); *H04L 2209/38* (2013.01)

(58) Field of Classification Search
None
See application file for complete search history.

(56) References Cited

U.S. PATENT DOCUMENTS

| | | |
|---|---|---|
| 2017/0250972 A1 | 8/2017 | Ronda et al. |
| 2018/0121909 A1 | 5/2018 | Christidis et al. |
| 2018/0343111 A1* | 11/2018 | Chen ..................... G06F 21/60 |
| 2019/0354397 A1* | 11/2019 | Goel ..................... G06F 21/64 |

FOREIGN PATENT DOCUMENTS

WO    2017198291 A1    11/2017

OTHER PUBLICATIONS

Dietterich et al., "A Sane Discussion of the Rising Fears of Artificial Intelligence (AI)." Communications of the ACM 58.10: 38-40. (Background).
Knirsch, et al. "Privacy-preserving smart grid tariff decisions with blockchain-based smart contracts." Sustainable Cloud and Energy Services. Springer, Cham, 2018. 85-116. (Background).
Neudecker et al., "Could Network Information Facilitate Address Clustering in Bitcoin?." International Conference on Financial Cryptography and Data Security. Springer, Cham, 2017. (Background).

(Continued)

*Primary Examiner* — Eric C Wai

(57) ABSTRACT

An example operation may include one or more of identifying endorsement requests to perform blockchain transaction endorsements, transmitting the endorsement requests to an ordering node, monitoring performance metrics of endorsement blockchain peers, assigning the endorsement requests to the endorsement blockchain peers based on the performance metrics, and receiving endorsed blockchain transactions.

20 Claims, 12 Drawing Sheets

(56) References Cited

OTHER PUBLICATIONS

Neudecker et al., "Timing Analysis for Inferring the Topology of the Bitcoin Peer-to-Peer Network." Ubiquitous Intelligence & Computing, Advanced and Trusted Computing, Scalable Computing and Communications, Cloud and Big Data Computing, Internet of People, and Smart World Congress (UIC/ATC/ScalCom/CBDCom/IoP/SmartWorld), 2016 Intl IEEE Conferences. IEEE, 2016. (Background).

Pallaroso, Virtual Resources & Internet of Things. Diss. 2017. (Related).

Xu et al. "A blockchain-based storage system for data analytics in the internet of things." New Advances in the Internet of Things. Springer, Cham, 2018. 119-138. (Background).

International Search Report and Written Opinion received in the corresponding International Application No. PCT/EP2019/064665, dated Aug. 14, 2019.

Yu et al: Virtualization for Distributed Ledger Technology (vDLT) 11, IEEE Access, vol. 6, Apr. 23, 2018 (Apr. 23, 2018), pp. 25019-25028, XP011684182, DOI: 10.1109/ACCESS.2018. 2829141.

* cited by examiner

SECURE CONSENSUS-BASED ENDORSEMENT FOR SELF-MONITORING BLOCKCHAIN

TECHNICAL FIELD

This application generally relates to consensus and peer management procedures on a blockchain, and more specifically to monitoring peers on a blockchain for optimal peer management with blockchain task delegation including endorsement and commitment of transactions in a self-monitoring blockchain.

BACKGROUND

A blockchain may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, peers operating in a blockchain network may have varying resources and constraints, resulting in different endorsement and commitments speeds when processing blockchain transactions. A peer may have limited resource, such as central processing unit (CPU) speeds, available memory, and disk speed/capacity. A peer may also be overloaded with processing too many requests at any given time. A peer may also be dishonest about, or overestimate, its advertised processing capacity to handle such transactions. As a result, a peer can become a bottleneck in both endorsement and commitment phases of a blockchain's operation.

For optimal performance, a blockchain network should balance a load of endorsements and commitment phases equally across peers, or in proportion to the peers' capabilities. An increase or decrease in the usage of certain peers depends on the transaction load requirements at any given time assigned to those peers. In general, a recommended policy for load balancing or scaling may provide a trustworthy approach to determine overuse, underuse, or bottlenecks in the blockchain network. State-of-the-art permissioned networks do not have self-evaluation and self-correction features. There are generally no operations to identify inefficient peers at a particular runtime. The blockchain networks are not automatically scalable and a load cannot be spread uniformly across provisioned peers. Also, peer nodes cannot be dynamically added to support higher runtime loads. Additionally, peer nodes are not re-provisioned to serve other roles, such as endorsers becoming committers or orderers on an as-needed basis. Networks can be manually evaluated, and scaled-up or rebalanced, but this approach leads to risks as each organization must perform such modifications independently in the absence of a trusted monitoring entity. Overprovisioning results in a waste of resources and under-provisioning results in poor performance. A wrong decision when managing loads by one organization can adversely impact the performance of other organizations on the same blockchain network.

SUMMARY

One example embodiment may provide a method that includes at least one of identifying endorsement requests to perform blockchain transaction endorsements, transmitting the endorsement requests to an ordering node, monitoring performance metrics of endorsement blockchain peers, assigning the endorsement requests to the endorsement blockchain peers based on the performance metrics, and receiving endorsed blockchain transactions.

Another example embodiment may provide an apparatus that includes a processor configured to identify one or more endorsement requests to perform blockchain transaction endorsements, a transmitter configured to transmit the one or more endorsement requests to an ordering node, the processor is further configured to monitor performance metrics of endorsement blockchain peers, and assign the one or more endorsement requests to the endorsement blockchain peers based on the performance metrics, and a receiver configured to receive endorsed blockchain transactions.

Still another example embodiment includes a non-transitory computer readable storage medium configured to store instructions that when executed cause a processor to perform one or more of identifying one or more endorsement requests to perform blockchain transaction endorsements, transmitting the one or more endorsement requests to an ordering node, monitoring performance metrics of endorsement blockchain peers, assigning the one or more endorsement requests to the endorsement blockchain peers based on the performance metrics, and receiving endorsed blockchain transactions.

DETAILED DESCRIPTION

Figure 1A:
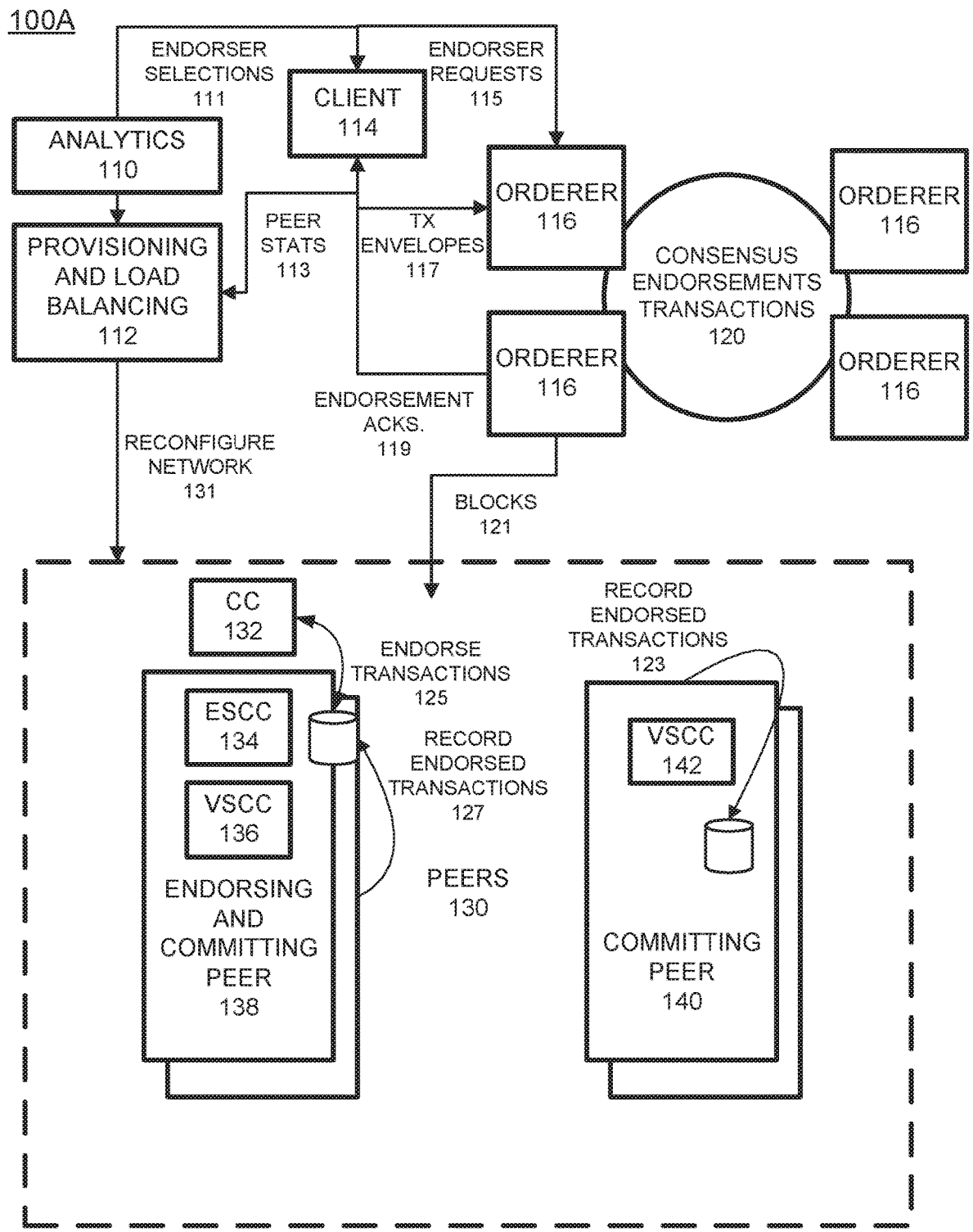
FIG. 1A illustrates a logic network diagram of peer monitoring and selecting procedure for processing a blockchain transaction load, according to example embodiments.

It will be readily understood that the instant components, as generally described and illustrated in the figures herein, may be arranged and designed in a wide variety of different configurations. Thus, the detailed description of the embodiments of at least one of a method, an apparatus, a non-transitory computer readable medium and a system, as represented in the associated figures and description, is not intended to limit the scope of the application, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of messages or network data, such as, packet, frame, datagram, etc. Furthermore, while certain types of messages, signaling and protocols may be depicted in exemplary embodiments they are not limited to a certain type of message, signaling or protocol.

Example embodiments provide methods, devices, networks and/or systems, which support a blockchain distributed system with selective peer management procedures. A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockhcain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Example embodiments provides for a continuous evaluation of performance of the peers at runtime, and identification of slow or bottlenecked peers in a trustworthy and non-repudiable manner. The evaluation of resources may provide an ability to rebalance a load across the network and/or add/remove/change peers roles and loads to achieve optimal efficiency. In a blockchain network, nodes are usually mutually untrusted. The entities are owned and administered by different organizations. One organization's monitoring service may not trust another organization's monitoring service. Clients have significant freedom of action in managing the execution of a blockchain transaction, as they determine which peers to send endorsement requests, and which responses from those peers to select for a transaction envelope to be sent to the orderer node.

Example embodiments provide for making the endorsement procedure a blockchain transaction. Endorsement requests and responses are ordered as they are generated, collected in a block, and committed to the shared ledger for non-repudiation. Identifying and processing the known differences among the peers can be inferred by examining the blockchain in a network self-evaluation procedure.

In operation, a client node sends endorsement requests to an orderer node instead of one or more endorsing peers. The endorsement requests and responses are stored in blocks, and peers perform endorsements upon receiving the blocks from the orderer node rather than direct requests from clients, and then sends responses to the orderer/ordering node. Monitoring and rebalancing can be performed by each client by monitoring the relative processing speeds of the peers, which include comparing block heights of endorsement requests and responses for each transaction. As a result, the selecting of peers may be performed by sending endorsement requests to those identified peers in an order of descending processing speeds identified for those peers.

FIG. 1A illustrates a logic network diagram of peer monitoring and selecting procedure for processing a blockchain transaction load, according to example embodiments. Referring to FIG. 1A, the configuration 100A includes a client node 114 which receives endorser selections 111 from an analytics module 110, which may be part of a computer processing system of any of the nodes, configured to monitor and determine the peer statistics 113 for peer node assignment purposes. The peer information may be used to provision the peers and balance a load 112 of blockchain transactions requiring assignment to peers. The client 114 may submit the endorser requests 115 which may be queued and which may require endorsement 115 to an order node 116 which may be part of a pool of orderer nodes 116 setup for performing consensus of the endorsements and blockchain transactions 120. Transaction envelopes 117 are also sent to orderer nodes 116. The output of the orderer 116 may include endorsement acknowledgements 119 and also blocks 121 to be distributed to the peers once peer assignment decisions have been rendered.

The load balancing module 112 may reconfigure 131 the network of peers based on monitored and updated activity of the peers 130. The blocks 121 enable the peers to perform the endorsing and/or committing needed to achieve the goals of the active load. A committing peer 140 may perform only committing of transactions to records the endorsed transactions 123 with the VSCC 142. The other peer 138, in this example, endorses and commits transactions with the endorsement system chaincode (ESCC) 134, the verification system chaincode (VSCC) 136 and the chaincode (CC) 132. The endorsed transactions 125 and recorded endorsed transactions 127 are then committed to the ledger.

The above elements are the fundamental components that govern the endorsement process. A system chaincode is a privileged chaincode that runs inside the same process in which the endorser is executed. A system chaincode has access to all the resources of the endorser. A chaincode, on the other hand, is a piece of code that interacts with a well-defined interface. To endorse a proposal, an endorser first execute the CC the proposal is referencing, and after that, the output of the chaincode is passed to the ESCC that produces a signature. The signature represents the endorsement of the proposal. The endorsements are placed in a transaction that is sent to the ordering service that orders the transaction in a block and disseminates the block. Once the block is received by a committing peer, each transaction, in that block, is passed to the VSCC that verifies that the endorsement policy is satisfied (i.e., there are enough endorsements).

Figure 1B:
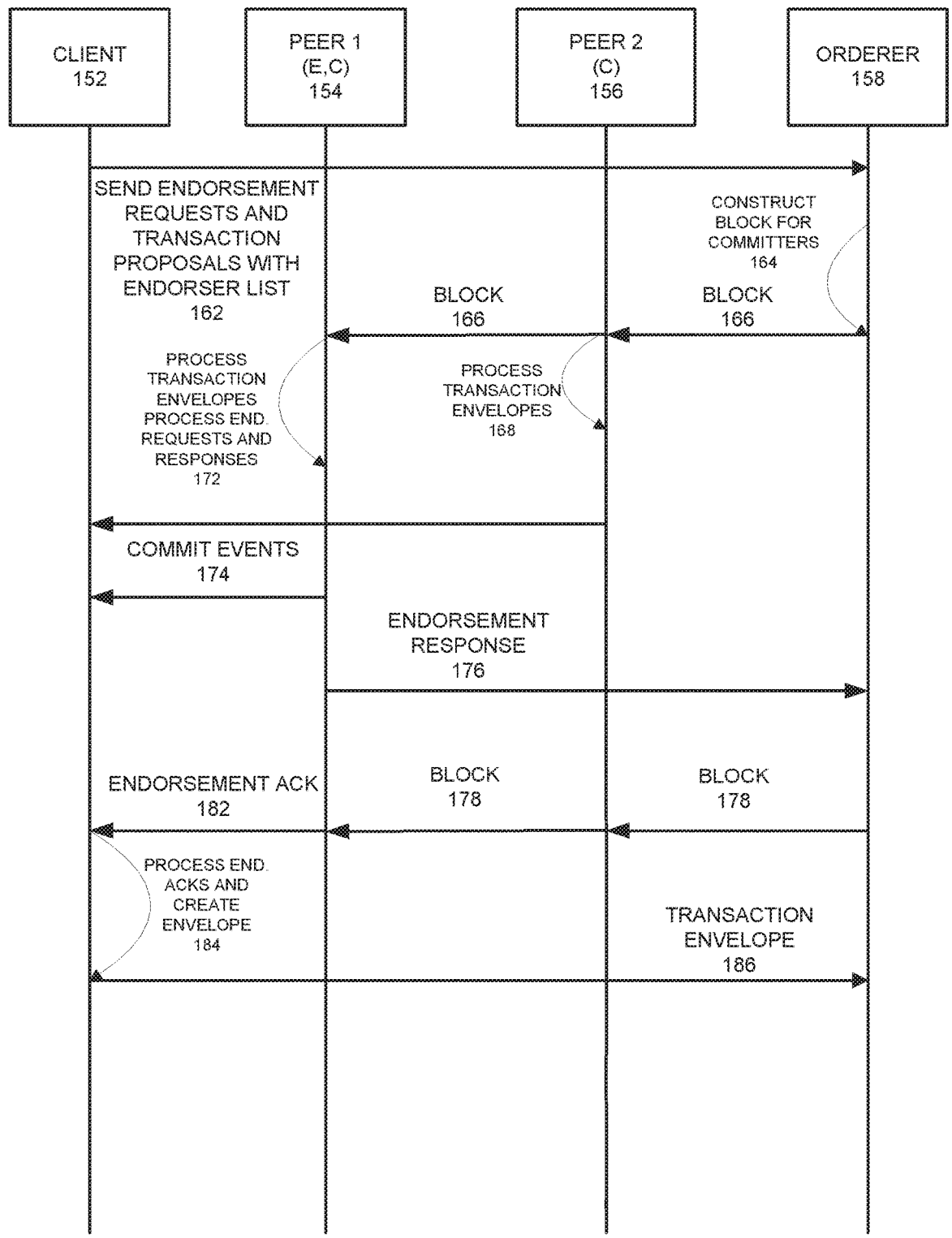
FIG. 1B illustrates a system configuration diagram of a set of operations performed during a peer management and load processing procedure, according to example embodiments.

FIG. 1B illustrates a system configuration diagram of a set of operations performed during a peer management and load processing procedure, according to example embodiments. Referring to FIG. 1B, the system configuration 100B, includes the client node 152, a first peer 154, which performs endorsements and commitments, a second peer 156 which performs commitments of transactions and an orderer node 158 which manages the distribution of the blockchain load to the peers. The client 152 may send the endorsement requests and transaction proposals with an endorser list 162 to the ordered 158, which manages the distribution of the load. The orderer 158 will construct a block(s) 164 for the committer peers. The block 166 is sent to the identified peers 154/156. Peer 156 may process the transaction envelopes 168, the other peer 154 may do the same and also process the endorsement requests and responses 172. The peers may then submit the committed events 174 to the client 152, which submits an endorsement response 176 to the orderer 158. In response, the blocks 178 are sent to the peers, and the endorsing peer submits an endorsement acknowledgement 182 to the client 152, which processes the endorsement acknowledgements and creates a transaction envelope 184 which is sent 186 to the orderer 158. The 'E' stands for endorser and the 'C' a committer. The processed transaction envelopes are committed to the ledger. During the processing of the endorsement acknowledgement, peer processing time is identified and compared to the block heights. Updates to known statistics for any of the peers are performed and the peers are re-sorted by their perceived processing capacity.

A transaction is generated as the results of certain events, such as a corresponding endorsement proposal appearing on the ledger. Here, appearing indicates that the endorsement proposal will be included in a certain block of the blockchain (i.e., ledger). The block height is the distance from the genesis block of the blockchain. The endorsement responses (i.e., one or more responses, depending on the endorsement policy) appears on the ledger. Each endorsement response will appear on the ledger in a certain block. Therefore, a certain distance from the genesis block (i.e., block height) may be identified. At this point, the distances or block heights of the endorsement proposal and responses can be compared to measure the responsiveness of the peers.

Figure 1C:
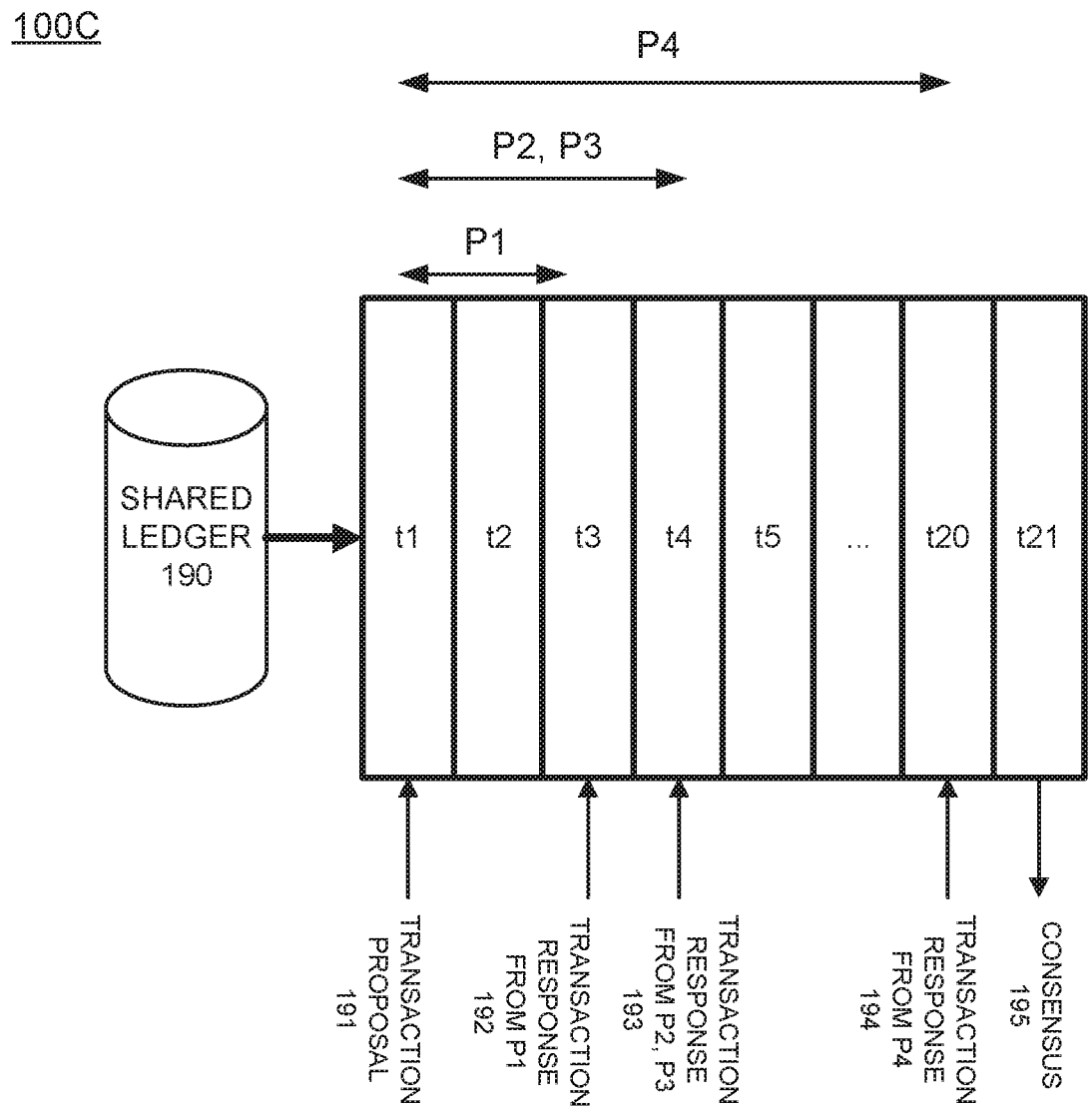
FIG. 1C illustrates an example peer processing management diagram of identifying peer load capacity and ranking the peers according to respective performance, according to example embodiments.

FIG. 1C illustrates an example peer processing management diagram of identifying peer load capacity and ranking the peers according to respective performance, according to example embodiments. Referring to FIG. 1C, the procedure for identifying fast peers, slow peers and middle-ground peers is demonstrated in a peer processing capacity model 100C where the peers P1, P2, P3 and P4 are monitored over the time required to complete the blockhain processing cycle. For example, the ledger transactions 190 are processed by P1 over about two time units, and P2 and P3 over about three time units. P4 requires 19 time units and is thus far slower than the other peers. The peers may be ranked according to their processing times. The processes for the peers are identified as a transaction proposal 191 for all peers, a transaction response from peer P1 192, a transaction response from peers P2 and P3 193 and a transaction response 194 from peer P4. Once all the responses are received, the consensus is performed 195. Clearly, the fourth peer P4 is not providing an optimal processing platform when compared to the other peers, and thus P4 should be moved to the bottom of the list of peer rankings. As a result, P4 will receive fewer endorsement requests, will be switched to a purely committing role and is added to the orderer network. The blocks are measured by a height that continues to grow from the genesis block at 't0' (block 0) and 'ti' is the block at height 'i'.

According to example, embodiments, with the handling of messages and block contents, message types may include an endorsement request, which is sent from the client to the orderer, an endorsement response, which is sent form the peer to the orderer, and endorsement response acknowledgment, which is sent form the orderer to the peer, and block commitment events, which are sent from the peer to the client. As may be observed, the orderer is committed to the management of the majority of the message transfers and assignment efforts.

In the blocks, the block may include an endorsement request, an endorsement response, an endorsement response acknowledgment and a transaction envelope or "transaction" created by the client. In one example, the monitoring procedure may identify a client that is attempting to receive more endorsements than are strictly needed based on the credentialing for that client. A client cannot arbitrarily reject a peer's response and/or deny that that the response was received from a peer without being detected by the monitoring procedure. Also, a client cannot submit incomplete or incorrect transaction envelopes without being identified, and a peer cannot pretend to be faster at processing endorsements and commitments than it is actually able to provide. The configuration provides for greater and more efficient transaction throughput as well as lower transaction latency.

Figure 2A:
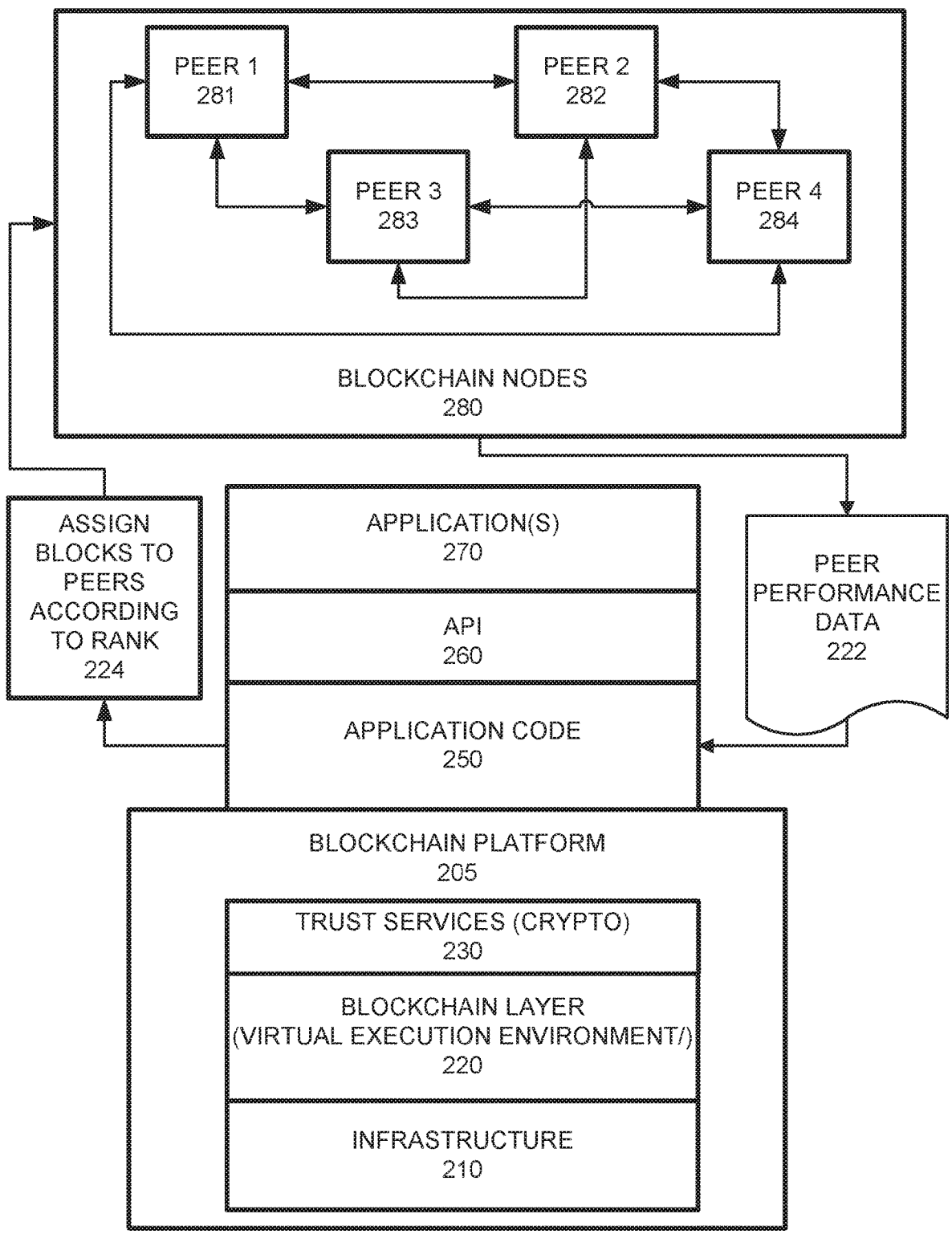
FIG. 2A illustrates an example peer node blockchain architecture configuration for an asset sharing scenario, according to example embodiments.

FIG. 2A illustrates a blockchain system architecture configuration 200A, according to example embodiments. Referring to FIG. 2A, blockchain architecture 200A may include certain blockchain elements, for example, a group 280 of blockchain nodes 281-284 which participate in blockchain transaction addition and validation process (consensus). One or more of the blockchain nodes 281-284 may endorse transactions and one or more blockchain nodes 281-284 may provide an ordering service for all blockchain nodes in the architecture 200A. A blockchain node may initiate a blockchain authentication and attempt to write to a blockchain immutable ledger stored in blockchain layer 220, a copy of which may also be stored on the underpinning physical infrastructure 210. The blockchain configuration may include one or more applications 270, which are linked to application programming interfaces (APIs) 260 to access and execute stored program/application code 250 (e.g., chaincode, smart contracts, etc.), which can be created according to a customized configuration sought by participants and can maintain their own state, control their own assets, and receive external information.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 250 via one or more interfaces exposed, and services provided, by blockchain platform 205. The code 250 may control blockchain assets. For example, the code 250 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. In one example, peer performance data 222 may be identified and processed by one or more processing entities (e.g., virtual machines) included in the blockchain layer 220. The result may include identifying optimal computing platforms associated with the peer entities to which the blocks should be assigned 224 for processing of blockchain tasks/events.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. In operation, the chaincode may receive a hash and retrieve from the blockchain a hash associated with the data template created by a previously stored feature extractor. If the hashes of the hash identifier and the hash created from the stored identifier template data match, then the chaincode sends an authorization key to the requested service. The chaincode may write to the blockchain data associated with the cryptographic details. In this example of FIG. 2A, the peer performance metrics may be written to the blockchain transaction blocks and other information sources for reference purposes when delegating the tasks to peers.

Figure 2B:
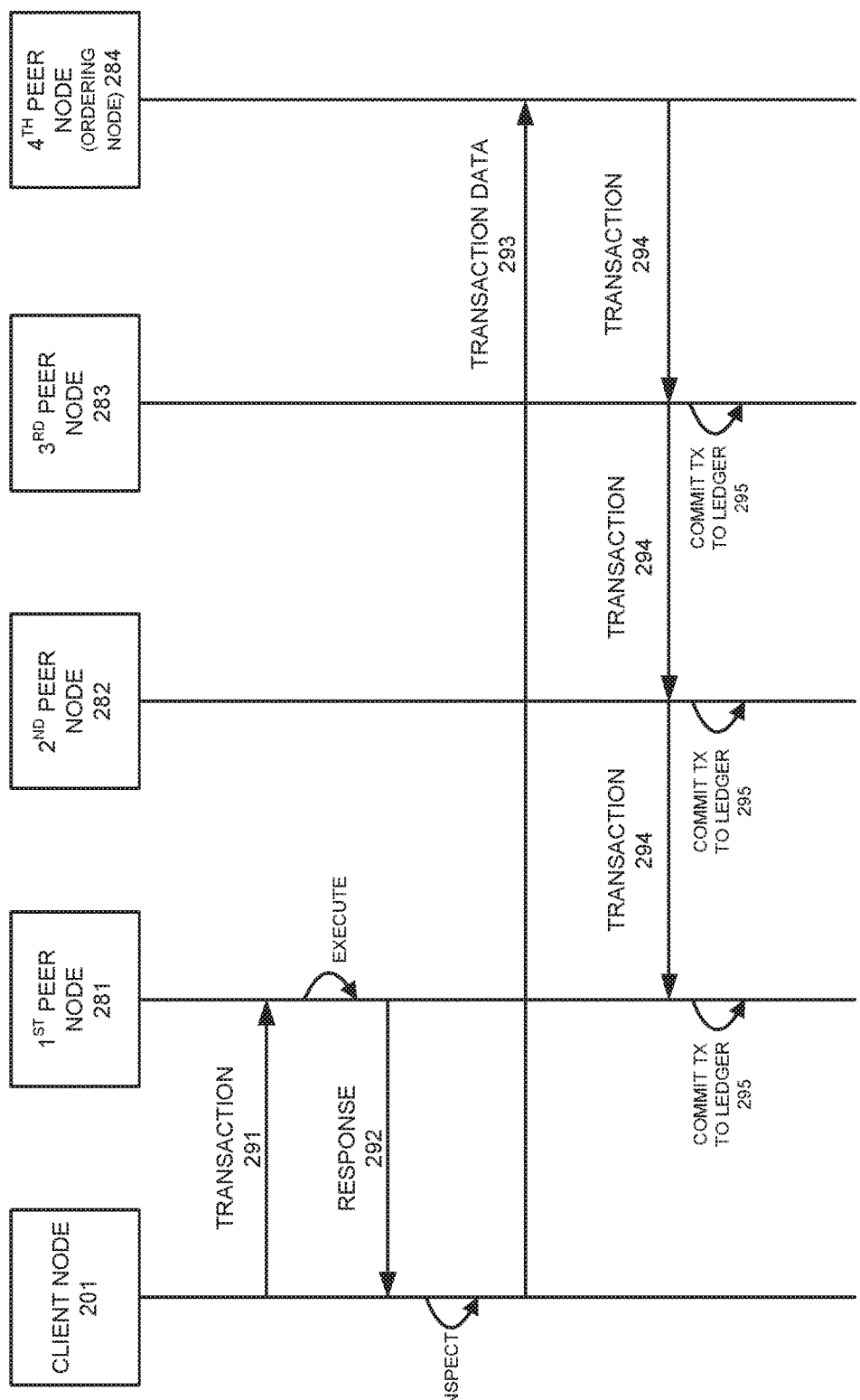
FIG. 2B illustrates an example peer node blockchain configuration, according to example embodiments.

FIG. 2B illustrates an example of a transactional flow 200B between nodes of the blockchain in accordance with an example embodiment. Referring to FIG. 2B, the transaction flow may include a transaction proposal 291 sent by an application client node 201 to an endorsing peer node 281. The endorsing peer 281 may verify the client signature, and execute a chaincode function to simulate the transaction. The output may include the chaincode results, a set of key/value versions that were read in the chaincode (read set), and the set of keys/values that were written in chaincode (write set). The proposal response 292 is sent back to the client 201 along with an endorsement signature, if approved. The client 201 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results, and authenticated the signatures against the transaction payload 293.

Referring again to FIG. 2B, the client node 201 initiates the transaction 291 by constructing and sending a request to the peer node 281, which is an endorser. The client 201 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 201 which parses the payload for the application to consume.

In response, the application of the client 201 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
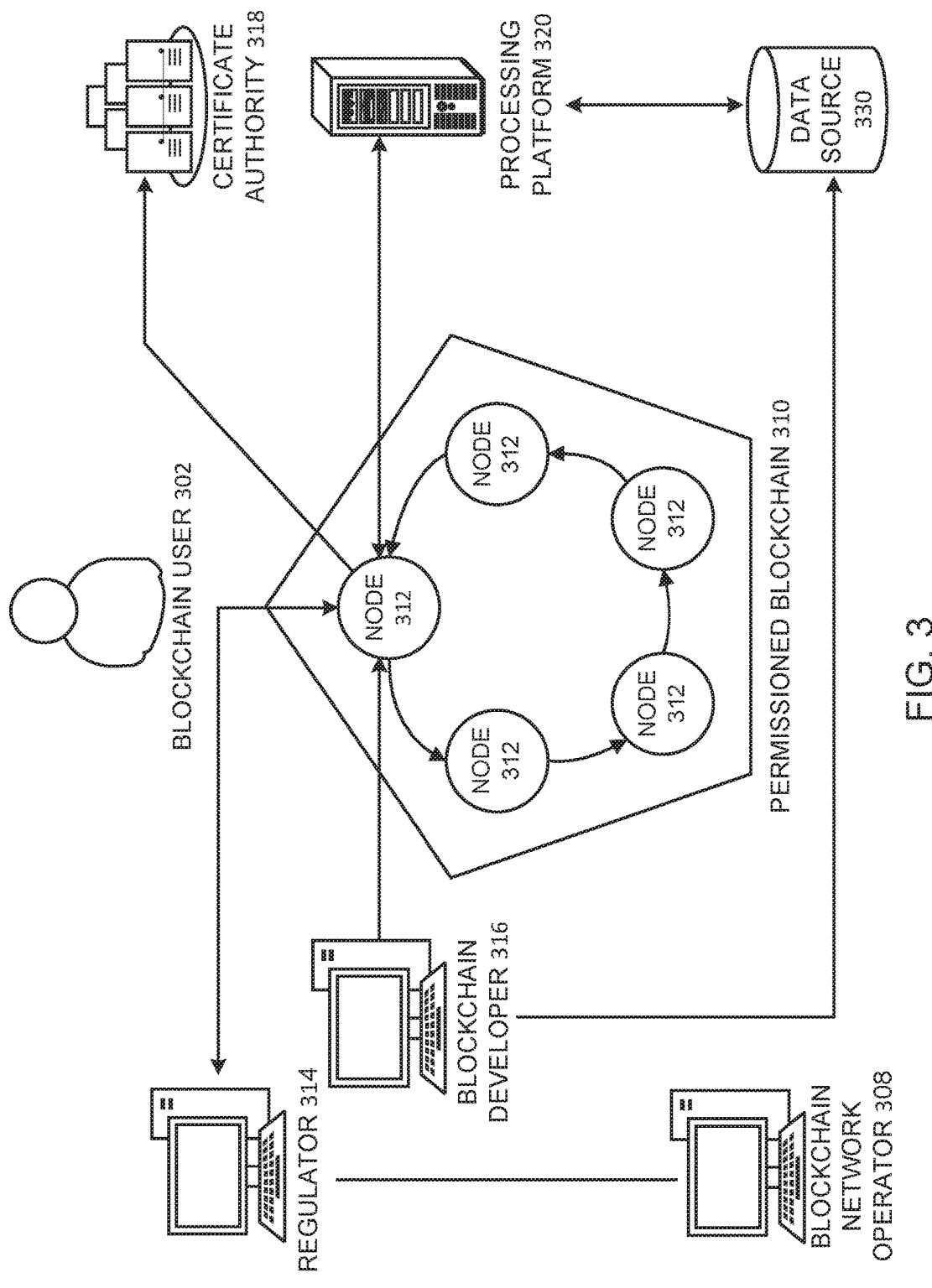
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator 308, through a system of nodes 312, manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
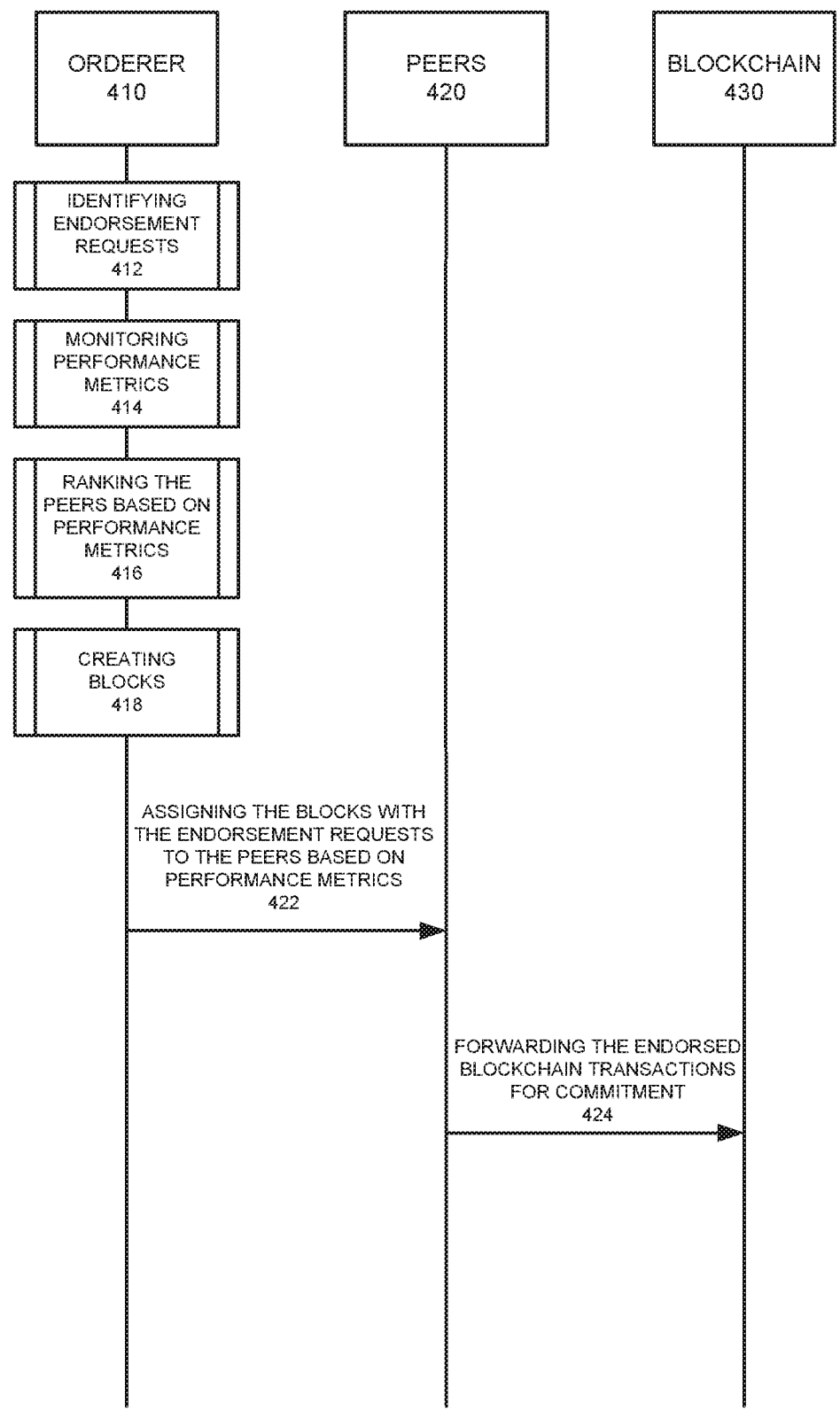
FIG. 4 illustrates a system messaging diagram for performing a peer management and transaction management configuration, according to example embodiments.

FIG. 4 illustrates a system messaging diagram for performing a peer management and transaction management configuration, according to example embodiments. Referring to FIG. 4, the configuration 400 provides another scenario where the orderer 410 manages operations with peers 420 and the blockchain 430. In operation, the orderer identifies various endorsement requests 412 which require assignment and processing by peer nodes 420. The peer node analytic/performance information is monitored and analyzed 414 and the peers may be ranked 416 and sorted in an order commensurate with their relative processing capacity. The peers may receive blocks which are created 418 to include various task related information. The assignment of the blocks is performed to distribute the endorsement requests in a manner consistent with the peer performance metric rankings 422. For example, the peers with the highest capacity rating are awarded the endorsement requests prior to any other peers to optimize performance of blockchain load processing. Once the transactions are endorsed and completed, the transactions are forwarded 424 to the blockchain 430 for commitment.

Figure 5A:
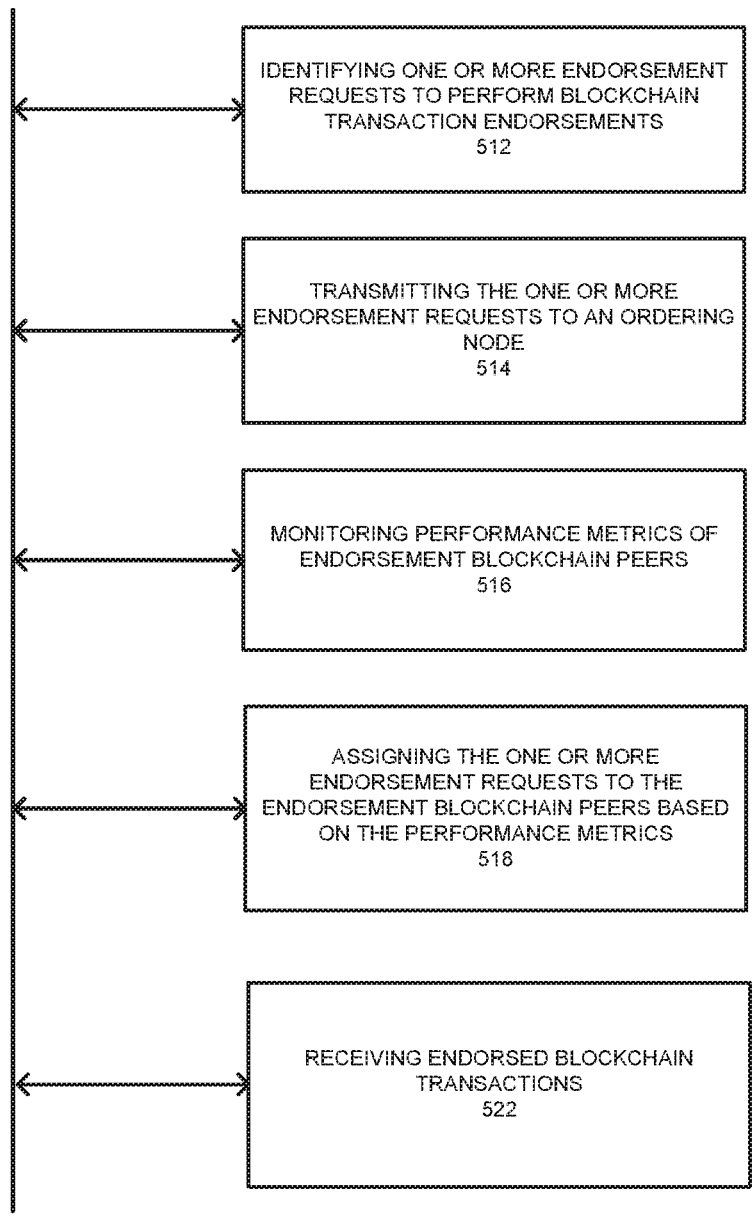
FIG. 5A illustrates a flow diagram of an example method of a peer management and transaction management in a blockchain, according to example embodiments.

FIG. 5A illustrates a flow diagram 500A of an example method of a peer management and transaction management in a blockchain, according to example embodiments. Referring to FIG. 5A, the method may include identifying one or more endorsement requests to perform blockchain transaction endorsements 512, transmitting the one or more endorsement requests to an ordering node 514, monitoring performance metrics of endorsement blockchain peers 516, assigning the endorsement requests to the endorsement blockchain peers based on the performance metrics 518, and receiving the endorsed blockchain transactions 522.

The method may also include storing the endorsement requests in a block prior to sending the blocks to the peers for review and processing. The method may also include transmitting the block to one or more of the endorsement blockchain peers. The performance metrics may include peer processing speeds of the endorsement blockchain peers based on block heights of the one or more endorsement requests. The method may also include ranking the endorsement blockchain peers in order according to their respective peer processing speeds. The endorsement blockchain peer with the lowest processing time is ranked last in a list of ranks for the endorsement blockchain peers. The block includes the one or more endorsement requests, one or more endorsement responses, one or more endorsement response acknowledgements and a transaction record. When assigning the endorsement requests to the endorsement blockchain peers based on the performance metrics the process also includes assigning the endorsement requests to certain ones of the endorsement blockchain peers having faster processing speeds than other blockchain peers.

Figure 5B:
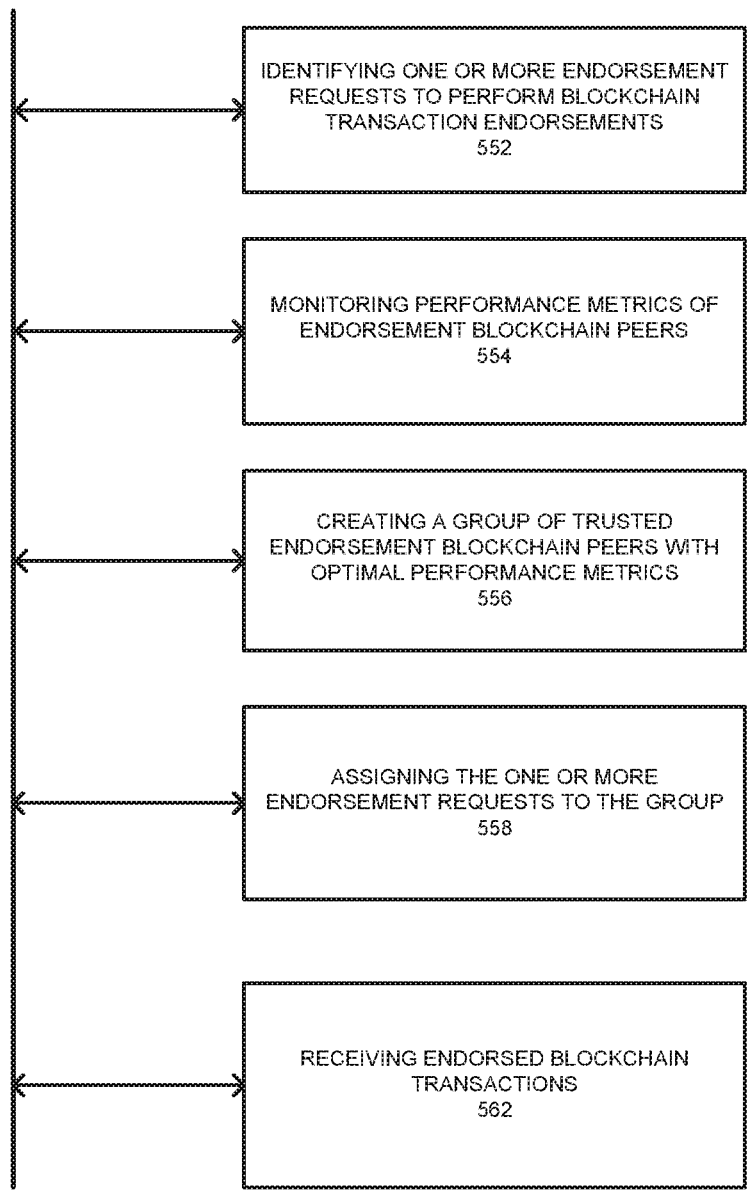
FIG. 5B illustrates a flow diagram of another example method of a peer management and transaction management in a blockchain, according to example embodiments.

FIG. 5B illustrates a flow diagram of another example method of a peer management and transaction management in a blockchain, according to example embodiments. Referring to FIG. 5B, the method 500B includes identifying one or more endorsement requests to perform blockchain transaction endorsements 552, monitoring performance metrics of endorsement blockchain peers 554, creating a group of trusted endorsement blockchain peers with optimal performance metrics 556, assigning the one or more endorsement requests to the group 558, and receiving endorsed blockchain transactions 562.

In addition to the performance analysis of the peers, the peers with optimal performance may be part of a group that is formed to manage the blockchain transactions and endorsement requests. This way, the need to identify a specific peer is eliminated by relying on a trusted group of peers. Once the top blockchain peers are identified, they can be placed into a group of top peers based on performance, secondary peers may also be placed in a group along with tertiary peers in another group. When assignments are made for endorsements, commitment of transactions, etc., the task can be sent to the group and selected or processed by one node in the group randomly selected as opposed to being specifically identified for the processing task event.

Figure 6A:
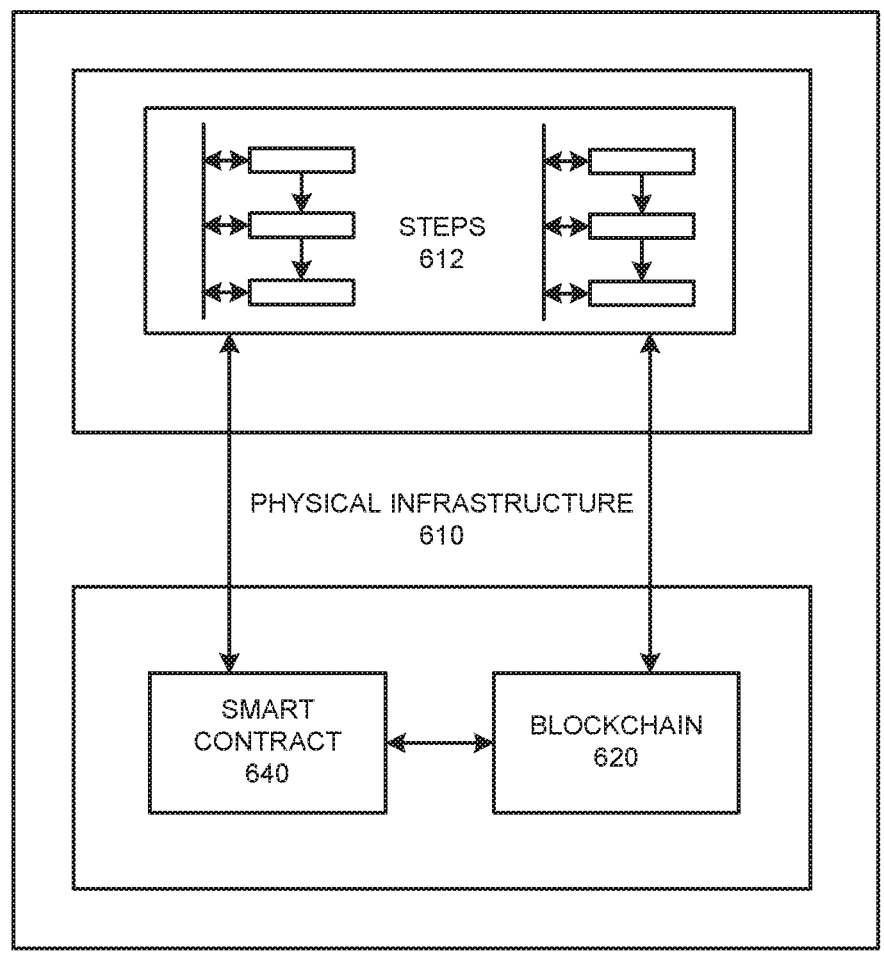
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
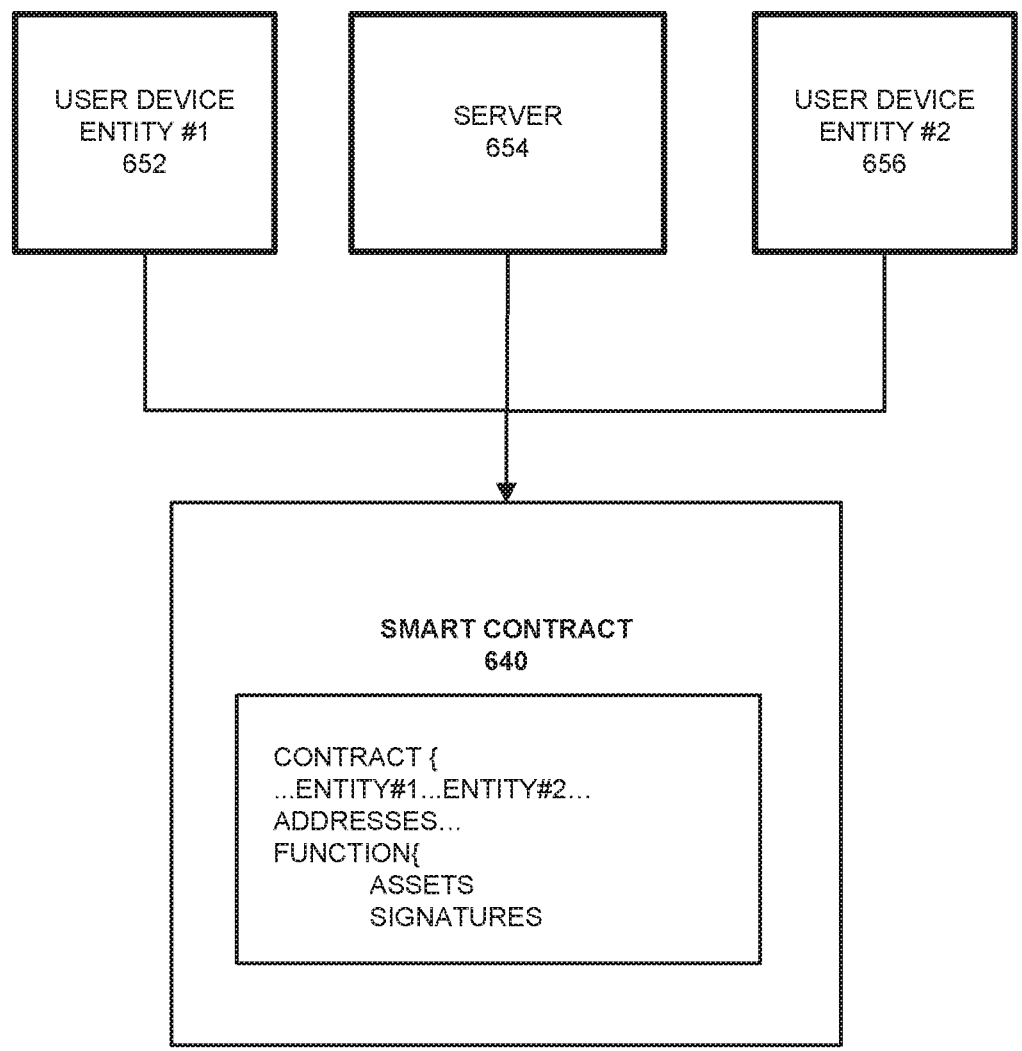
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 600B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
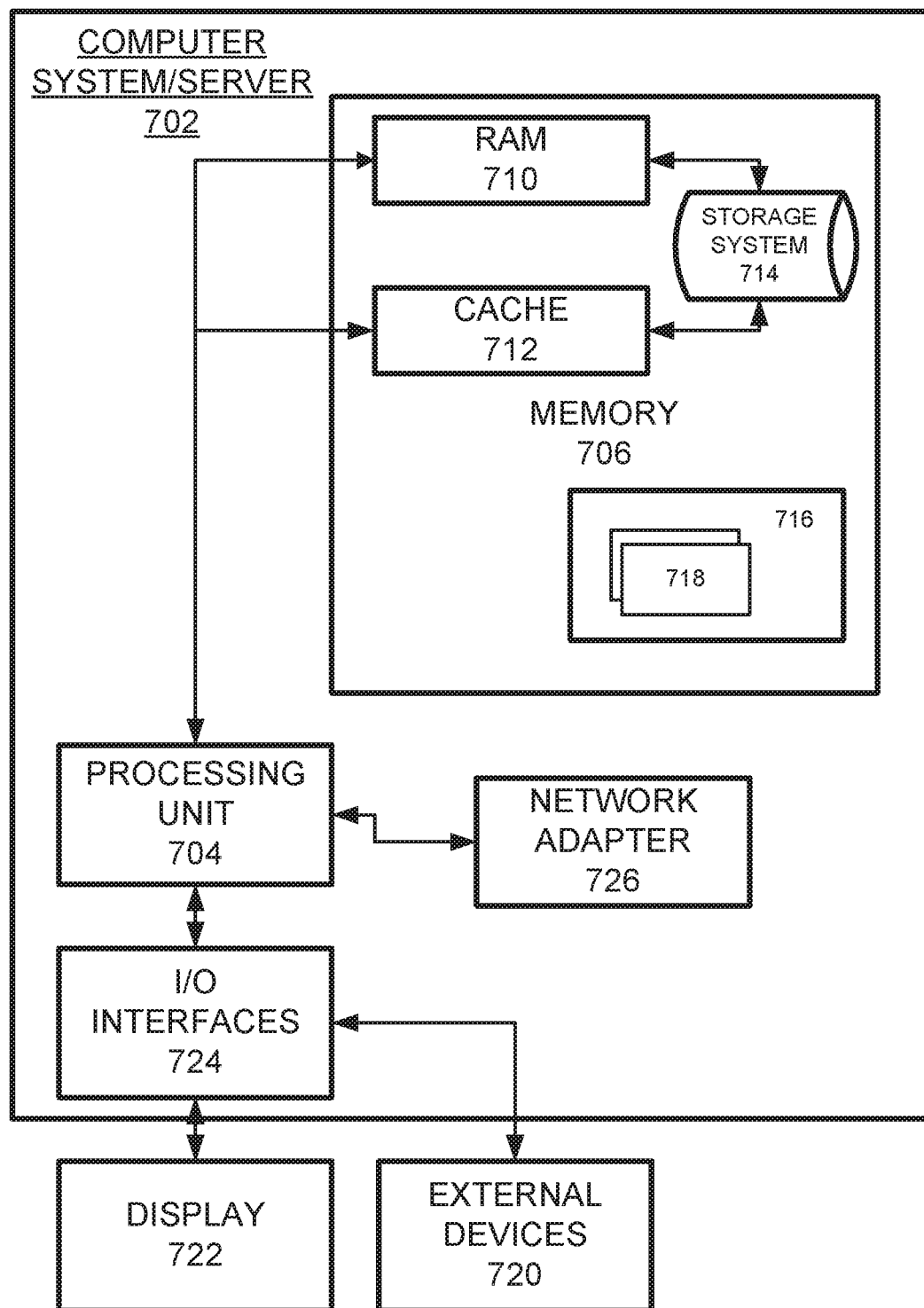
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying one or more endorsement requests to perform blockchain transaction endorsements;
   transmitting the one or more endorsement requests to an ordering node;
   transmitting, via the ordering node, and for each of the one or more endorsement requests, a block containing an endorsement proposal to an endorsement blockchain peer;
   receiving, via the ordering node, an endorsement response from the endorsement blockchain peer;
   identifying, via the ordering node, a block height of the block based on a location of the endorsement response; and
   assigning the one or more endorsement requests to the endorsement blockchain peers based on performance metrics derived from the block height.

2. The method of claim 1, further comprising:
   storing the one or more endorsement requests in a block; and
   transmitting the block to one or more of the endorsement blockchain peers.

3. The method of claim 1, wherein the performance metrics comprise:
   peer processing speeds of the endorsement blockchain peers based on the block heights of the one or more endorsement requests.

4. The method of claim 3, further comprising:
   ranking the endorsement blockchain peers in order according to their respective peer processing speeds.

5. The method of claim 4, wherein the endorsement blockchain peer with the lowest processing time is ranked last in a list of ranks for the endorsement blockchain peers.

6. The method of claim 2, wherein the block comprises:
   the one or more endorsement requests, one or more endorsement responses, one or more endorsement response acknowledgements and a transaction record.

7. The method of claim 1, wherein the assigning the endorsement requests to the endorsement blockchain peers based on the performance metrics comprises:
   assigning the endorsement requests to one or more of the endorsement blockchain peers having faster processing speeds than other ones of the endorsement blockchain peers.

8. An apparatus, comprising:
   a processor configured to:
     receive one or more endorsement requests to perform blockchain transaction endorsements;
     transmit, for each of the one or more endorsement requests, a block containing an endorsement proposal to an endorsement blockchain peer;
     receive an endorsement response from the endorsement blockchain peer;
     identify a block height of the block based on a location of the endorsement response;
     assign the one or more endorsement requests to the endorsement blockchain peers based on performance metrics derived from the block height.

9. The apparatus of claim 8, wherein the processor is further configured to:
   store the one or more endorsement requests in a block, and transmit the block to one or more of the endorsement blockchain peers.

10. The apparatus of claim 8, wherein the performance metrics comprise:
peer processing speeds of the endorsement blockchain peers based on the block heights of the one or more endorsement requests.

11. The apparatus of claim 10, wherein the processor is further configured to:
rank the endorsement blockchain peers in order according to their respective peer processing speeds.

12. The apparatus of claim 11, wherein the endorsement blockchain peer with the lowest processing time is ranked last in a list of ranks for the endorsement blockchain peers.

13. The apparatus of claim 9, wherein the block comprises:
the one or more endorsement requests, one or more endorsement responses, one or more endorsement response acknowledgements and a transaction record.

14. The apparatus of claim 8, wherein the processor is configured to:
assign the endorsement requests to the endorsement blockchain peers based on the performance metrics by assignment of the endorsement requests to one or more of the endorsement blockchain peers having faster processing speeds than other ones of the endorsement blockchain peers.

15. A non-transitory computer readable storage medium configured to store one or more instructions that when executed by a processor cause processor to perform:
identifying one or more endorsement requests to perform blockchain transaction endorsements;
transmitting the one or more endorsement requests to an ordering node;
transmitting, via the ordering node, and for each of the one or more endorsement requests, a block containing an endorsement proposal to an endorsement blockchain peer;
receiving, via the ordering node, an endorsement response from the endorsement blockchain peer;
identifying, via the ordering node, a block height of the block based on a location of the endorsement response;
assigning the one or more endorsement requests to the endorsement blockchain peers based on performance metrics derived from the block height.

16. The non-transitory computer readable storage medium of claim 15, wherein the one or more instructions are further configured to cause the processor to perform:
storing the one or more endorsement requests in a block; and
transmitting the block to one or more of the endorsement blockchain peers.

17. The non-transitory computer readable storage medium of claim 15, wherein the performance metrics comprise:
peer processing speeds of the endorsement blockchain peers based on the block heights of the one or more endorsement requests.

18. The non-transitory computer readable storage medium of claim 17, wherein the one or more instructions are further configured to cause the processor to perform:
ranking the endorsement blockchain peers in order according to their respective peer processing speeds.

19. The non-transitory computer readable storage medium of claim 18, wherein the endorsement blockchain peer with the lowest processing time is ranked last in a list of ranks for the endorsement blockchain peers.

20. The non-transitory computer readable storage medium of claim 16, wherein the block comprises:
the one or more endorsement requests, one or more endorsement responses, one or more endorsement response acknowledgements and a transaction record, and
wherein the assigning the endorsement requests to the endorsement blockchain peers based on the performance metrics comprises:
assigning the endorsement requests to one or more of the endorsement blockchain peers having faster processing speeds than other ones of the endorsement blockchain peers.

* * * * *